J. WILMINGTON.
Sheet-Metal Cutter.
No. 10,317.
Patented Dec. 13, 1853.
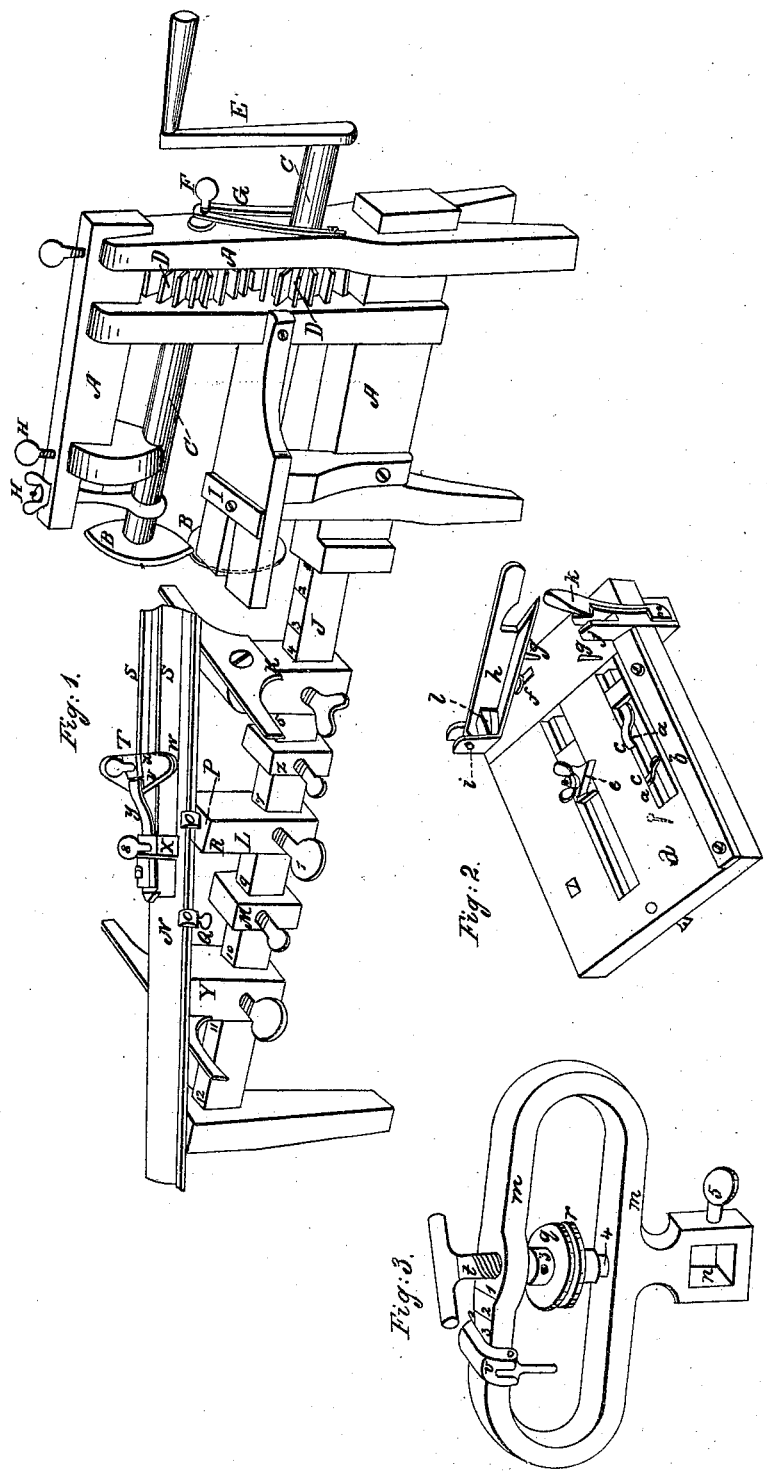

UNITED STATES PATENT OFFICE.

JNO. WILMINGTON, OF SOUTH BEND, INDIANA.

MACHINE FOR CUTTING SHEET METAL.

Specification of Letters Patent No. 10,317, dated December 13, 1853.

*To all whom it may concern:*

Be it known that I, JOHN WILMINGTON, of South Bend, in the county of St. Joseph and State of Indiana, have invented a new and useful Machine for cutting Sheet Metals in Angles, Parallel Lines, Circles, and Segments of Circles; and I do hereby declare that the following is a full, clear, and exact description of the construction and operation of the same, reference being had to the annexed drawings, making a part of this specification, in which—

Figures 1, 2, and 3 are a descriptive view, Figs. 2 and 3 being used in connection with Fig. 1.

To enable others skilled in the art to make and use my invention I will proceed to describe its construction and operation.

I construct an iron frame as shown at A A A in Fig. 1 of the accompanying drawing of sufficient strength that it will not spring, and of dimensions proportionate to the size of the material to be cut. The shears B B are screwed, or otherwise fastened on the ends of the shafts C C. On these shafts are placed the cog wheels D D to reverse the motion, and the crank (or pulley) E by which they may be turned. The thumb-screw F passes through the spring G and acts against the shaft to keep the inner shear against the outer. The shears are adjusted by temper screws H H, acting against each other from above, on the upper shear shaft.

I is an adjustable gage attached to the frame A A A for regulating the breadth of strips to be cut in parallel lines. The index bar J projects from the frame A A A to support the movable guides K Y, movable center L and adjustable stops M Z and has marked upon it measures from the cut of the shears out. The vise tram N has flanges on each side at the bottom, to which is attached by clasps O O the movable pivot P which is fastened by set screw Q and turns in the adjustable top center R which is moved transversely in the movable center L, the two flanges S S on each side of the tram turn upward and outward, forming a recess in the top for the center of the lower jaw of the movable vise T to move in. The front of the jaws U V, of movable vise T must be a sharp oval and formed to hold the sheets horizontally, and their breadth should nearly equal, but never exceed that of the shortest segment on the concave side designated to be cut. The main body of the under jaw V crosses the tram at right angles, forming a shoulder to place the metallic sheets square against, from its center and ends are dropped and jutting forward lips W to form the grip on connection with the upper jaw u which drops to the tram and is sustained by a spring y connecting it with the clasp X, inclosing the flanges and designs to hold the vise by a set screw 8.

The table a in Fig. 2, on which metallic sheets are laid, if to be cut in right angles, one edge is placed against the ledge b. The two adjustable spring stops c c for gaging lengths and breadths of right angled figures are placed in a grooved mortise in the table a, the shorter spring above and the longer below, this has a slot through which a thumb-screw (unseen in the drawing) passes into the upper to hold them to their respective places, the hooked points d d at the extremity of the springs readily yield to the weight of the sheets and drop to a level with the surface of the table.

The angular adjustable stop e is designed to receive one corner of the sheets to be cut in other than right angles, while the edge of such sheet rests against the movable stop f, which two several stops may be adjusted to the various lengths and angles required. The two pins g g are inserted in the table at an angle of forty-five degrees from the ledge. When sheets are required to be cut eight square, the length of the squares will be regulated by the relative position of the adjustable stop f. In cutting light sheets the table a may be moved by hand, and in cutting heavy sheets by rack and pinion, or otherwise, or the table may be stationary and the shears moved to the metallic sheets.

The spring clamp h should be sufficiently elastic to yield and adjust itself to any suitable number of sheets, and hold them to their place while being cut, having one end fastened by the hinge i, the other end held in the guide j by the spring catch k. The spring l is fastened to the carriage and acting against the spring clamp near the hinge raises it up when relieved from the spring catch k.

In Fig. 1. K Y refer to elevated movable guides fastened on the index bar by set screws and crossing it at right angles for table a to rest and move upon, and also for the vise tram to rest and sweep upon, and in this operation the guide K should be placed distant from the shears a little more than the depth of the segments to be cut; ascertain the circle of the segment required and place the center of the movable center L distant from the shears half the diameter of said circle and fasten by set screw s, then fasten the adjustable stop M against the side of said center opposite from the shears and fasten the other adjustable stop z the depth of the segment to be cut distant from the side of the center L toward the shears, with the center L against the stop M, fasten the pivot P so that the end of the vise tram which is parallel with the index bar will reach the shears, abating the depth of the segment to be cut, let the center of the sheets fastened in the vise be in line with the center of the vise and their edges against the shears, fasten the vise by set-screw 8 and it is now ready to cut the convex edge. Then remove the center L to stop Z, fasten it and it is ready for cutting the concave edge. When more than one segment is to be taken from the same sheet return center L to stop M, slide the vise on the tram until the corner of the sheet may reach the shears and it is ready for cutting.

Fig. 3. is a perspective view of the revolving plates, or clamp, for holding sheets to be cut in full circles, its movable frame m, m, may be placed on the index bar J through the mortise n, with its center distant from the shears half the diameter of the desired circle and fastened by set screw 5, the sheets to be cut are placed between the plates q, r, the under plate r, is placed upon the pivot 4, the upper plate q is suspended by the screw t, through the frame m, m, forming a pivot in the hub of the plate q, through which the small screw is inserted into a groove, unseen, in the side of the pivot, thus holding the plate and giving it freedom of action. The upper plate q is pressed upon by turning the screw t and the friction between the plates and sheets being greater than between the plates and pivots, the sheets turn readily by the draft of the shears without changing their center of motion. The knuckle gage v on the upper part of the frame m, m, may be adjusted by the index there marked and fastened by a set screw. A pendant drops from it below the level of the plates, and is placed distant from the center of said plates, half the diameter of the desired circle, to aid in finding the center of the sheets.

I do not claim the rotary shears, but

What I do claim as my invention and desire to secure by Letters Patent, is—

The vise T in combination with the tram upon which it moves, and upon which the sheet rests during the operation of cutting as herein fully set forth.

In testimony whereof I have hereunto signed my name before two subscribing witnesses.

JOHN WILMINGTON.

Witnesses:
 GEO. PATTEN,
 JNO. OBER.